UNITED STATES PATENT OFFICE.

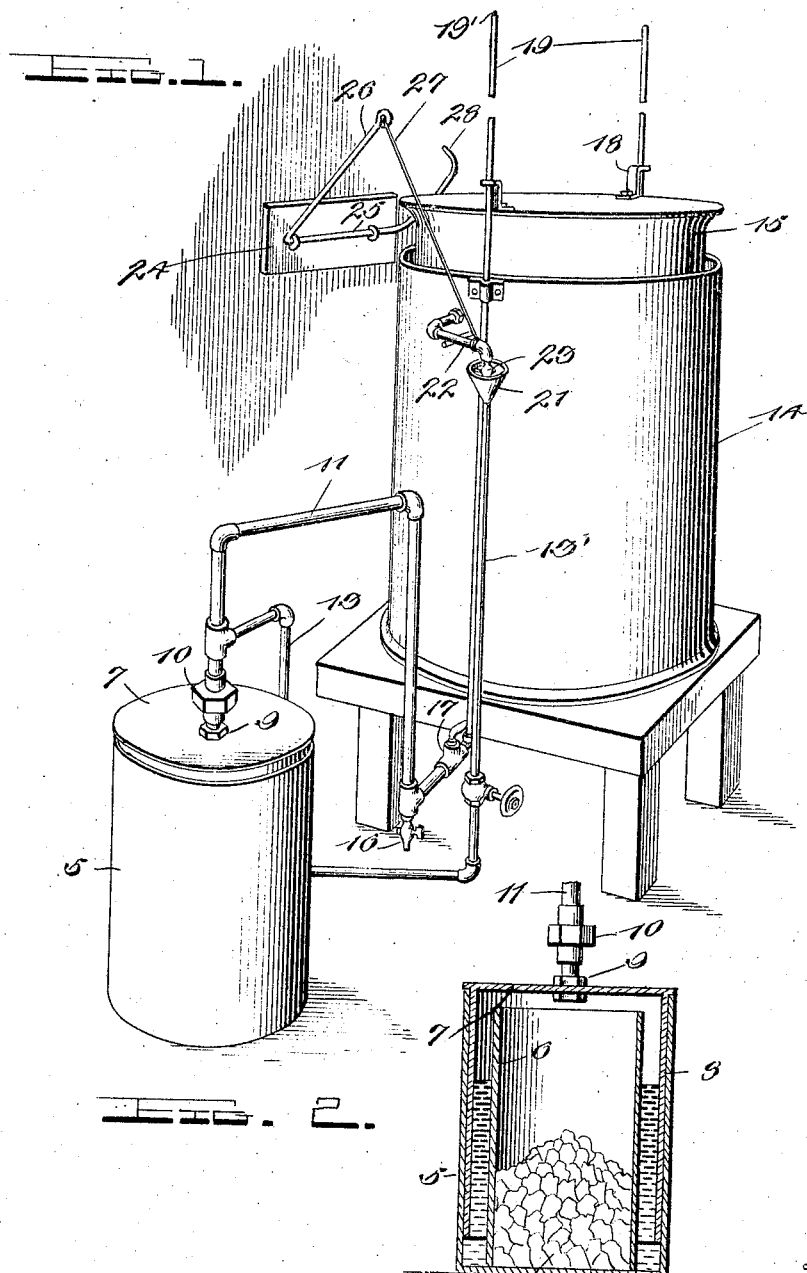

PETER MINTER, WILLIAM MINTER, AND IGNATIUS MINTER, OF HIGHLAND, WISCONSIN.

ACETYLENE-GAS GENERATOR.

1,027,750.

Specification of Letters Patent. Patented May 28, 1912.

Application filed January 27, 1912. Serial No. 673,940.

*To all whom it may concern:*

Be it known that we, PETER MINTER, WILLIAM MINTER, and IGNATIUS MINTER, citizens of the United States, residing at Highland, in the county of Iowa and State of Wisconsin, have invented certain new and useful Improvements in Acetylene-Gas Generators, of which the following is a specification, reference being had to the accompanying drawings.

This invention relates to improvements in acetylene gas generators and has for its primary object to provide a simple and positively acting apparatus of this character whereby gas for illuminating or other purposes may be inexpensively manufactured.

Another and more specific object of the invention resides in the provision of means for automatically supplying water to the generator whereby the carbid is converted into gas.

Another object of the invention is to provide a gas generating apparatus of the above described character including in combination a generator and gasometer, a gas supply pipe connecting the same, a water feed pipe connected to the generator, and a movable supply pipe connected to the gasometer and means to automatically move the same upon the increase of gas pressure whereby the supply of water to the generator is automatically cut off.

With the above and other objects in view, the invention consists of the novel features of construction, combination and arrangement of parts hereinafter fully described and claimed, and illustrated in the accompanying drawings, in which—

Figure 1 is a perspective view of our improved gas generating apparatus showing the parts as arranged in the process of gas manufacture; Fig. 2 is a vertical section of the generator.

Referring in detail to the drawings 5 designates the generator which consists of the spaced concentric outer and inner shells 5 and 6 respectively and 7 designates a removable closure for the outer shell which includes a tubular body 8 adapted to be received in the space between said outer and inner shells. This space is filled with water as shown. To the top 7 of the generator a nipple 9 is secured which is disposed centrally in said top and above the upper open end of the inner shell 6. A coupling or union 10 connects this nipple to the pipe 11 which conducts the generated gas to the gasometer where it is purified. The inner shell 6 of the generator is filled with carbid as indicated at 12 to which water is supplied through the medium of the pipe 13 which is connected to the gas conducting pipe 11 as clearly shown in Fig. 1.

The gasometer consists of a cylindrical vessel 14 which is proportionate in size to the generator 5 and in accordance with the gas generating capacity thereof. A bell 15 is vertically movable in this cylindrical vessel which is filled with water to provide a seal for the lower open end of the bell. The gas conducting pipe 11 extends from the generator 5 and extends centrally through the bottom of the gasometer shell 14, said pipe having a water drain valve 16 therein and a gas controlling valve or cock 17. The upper closed end of the gas bell 15 carries the perforated brackets 18 which loosely receive the vertical guide rods 19 arranged at diametrically opposite points upon the gasometer and are preferably secured to the periphery of the shell 14. One of the vertical guide members 19 may be in the form of a pipe and connected to the gas pipe 11, the upper end of said vertical pipe being provided with a suitable tip as shown at 19' whereby the cellar or other compartment wherein the apparatus is located may be illuminated without necessitating the provision of a separate service pipe.

A service pipe 20 is connected to the conducting pipe 11, said service pipe being extended along the walls of the building and through the various apartments thereof. The pipe 11 has a vertically disposed portion (not shown) extending through the bottom of the shell 14 of the gasometer and having its upper open end disposed above the level of the water therein to discharge the gas into the upper portion of the bell 15.

The water feed pipe 13 for the generator has a vertically extended portion 13' which is located adjacent to the gasometer and is provided upon its upper end with a funnel 21. To the shell 14 one end of a supply pipe 22 is connected, said pipe being rotatably mounted in the wall of said shell at one end and provided upon its other end with a cock or faucet 23 whereby the water supply may be conveniently controlled. Upon the wall or other permanent support a piece of board or plank indicated at 24 is securely fastened and upon the same a rod 25 is rotatably mounted in suitable bearings. One end of this rod is bent at a right angle and forwardly extended as indicated at 26 and has connected thereto one end of a wire 27, the other end of which is connected to the rotatably mounted water supply pipe 22. The other end of the rod 25 is also forwardly extended and provided with a curved or hooked extremity as indicated at 28. This curved end of the rod bears against the edge of the upper closed end of the movable gas bell 15 and as this gas bell is raised by the pressure of gas therein, it will be obvious that the rod or shaft 25 will be rocked in its bearings, and through the medium of the angularly disposed end portion 26 thereof and the connecting wire 27, the water supply pipe 22 will be swung upwardly to the position shown in Fig. 2.

From the foregoing it is thought that the construction and manner of operation of our improved gas generating apparatus will be fully understood. When the gas is drawn off from the gasometer and the pressure beneath the head of the bell is gradually reduced, said bell lowers into the shell 14, and the supply pipe 22 drops by gravity to the position shown in Fig. 1, the hooked end 28 of the rock shaft 25 at all times being in contact with said bell. The supply of carbid for the generator may be readily renewed by disconnecting the top 7 of the generator from the gas pipe 11 by the manipulation of the coupling 10. The pipe 22 discharges the water from the gasometer into the funnel 21 on the upper end of the water feed pipe 13. Thus the generator is at all times automatically kept supplied with water so that as soon as the gas pressure in the gasometer is diminished to the proper point, the supply of water to the carbid in the generator is renewed and the generation of gas reëstablished.

A device constructed in accordance with the present invention is simple, may be inexpensively manufactured and is positive and reliable in practical operation. The apparatus is also durable in construction and by means of the same a constant gas supply may be maintained at an insignificant cost.

While we have shown and described the preferred form and arrangement of the various elements, it will be understood that the invention is susceptible of considerable modification without departing from the essential feature or sacrificing any of the advantages thereof.

Having thus described the invention what is claimed is:—

In an acetylene gas generator, the combination with a generating vessel, a gasometer and a gas conducting pipe connecting said generator and gasometer, of a water feed pipe for the generator having a vertically disposed portion open at its upper end, said gasometer including an outer water containing shell and a bell movable therein, a rotatably mounted rod having one of its ends engaged with said bell, the other end of said rod being bent at right angles, and a flexible connection between said latter end of the rod and said supply pipe whereby said supply pipe is elevated upon the increase of gas pressure to cut off the water supply to the generator.

In testimony whereof we hereunto affix our signatures in the presence of two witnesses.

PETER MINTER.
WILLIAM MINTER.
IGNATIUS MINTER.

Witnesses:
JOSEPH HASELHOFF,
BENNIE KROLL.